No. 888,219. PATENTED MAY 19, 1908.
J. F. BRUHN.
HAY STACKER.
APPLICATION FILED SEPT. 23, 1907.
3 SHEETS—SHEET 1.
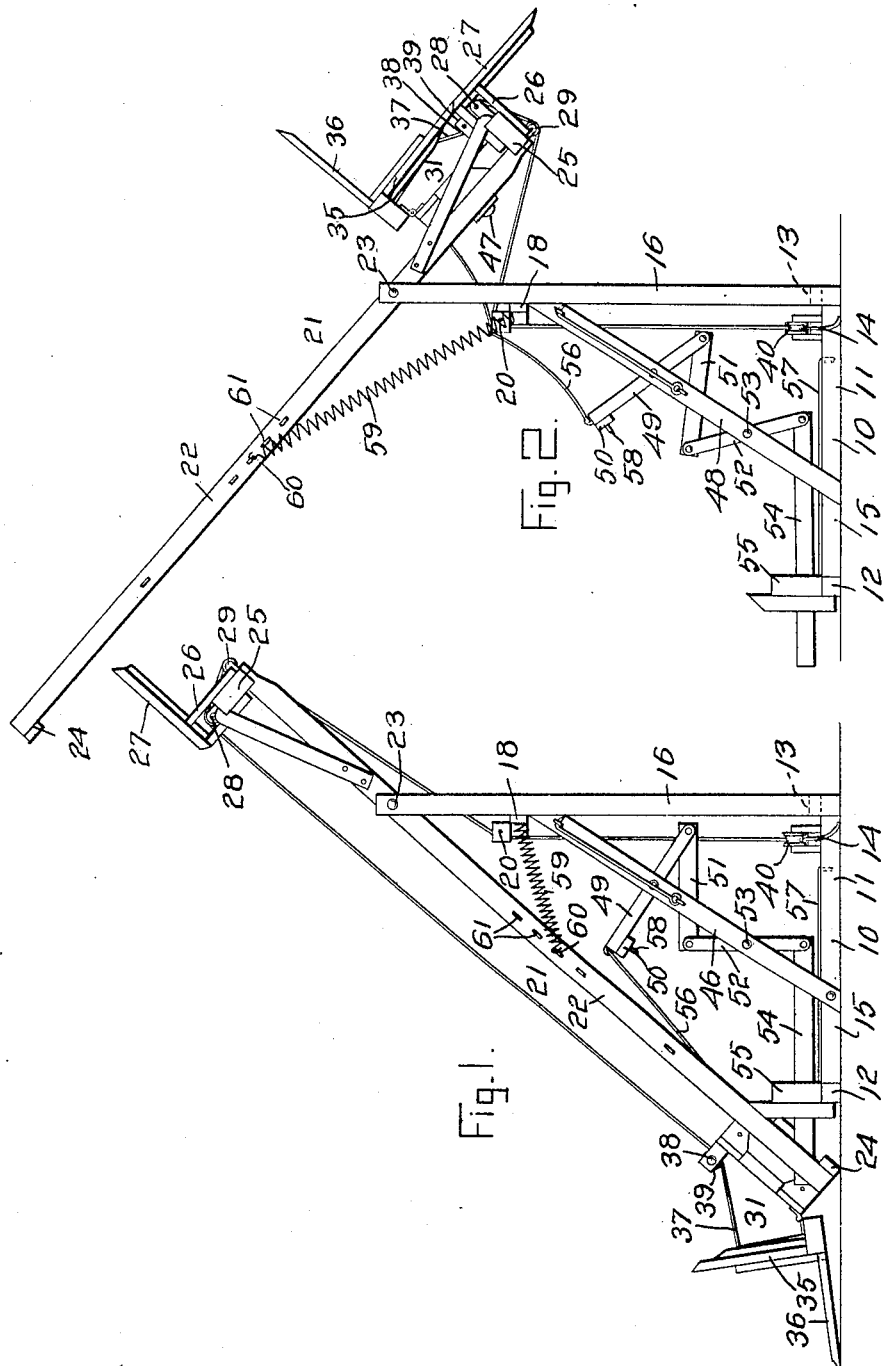

No. 888,219.
PATENTED MAY 19, 1908.
J. F. BRUHN.
HAY STACKER.
APPLICATION FILED SEPT. 23, 1907.
3 SHEETS—SHEET 2.
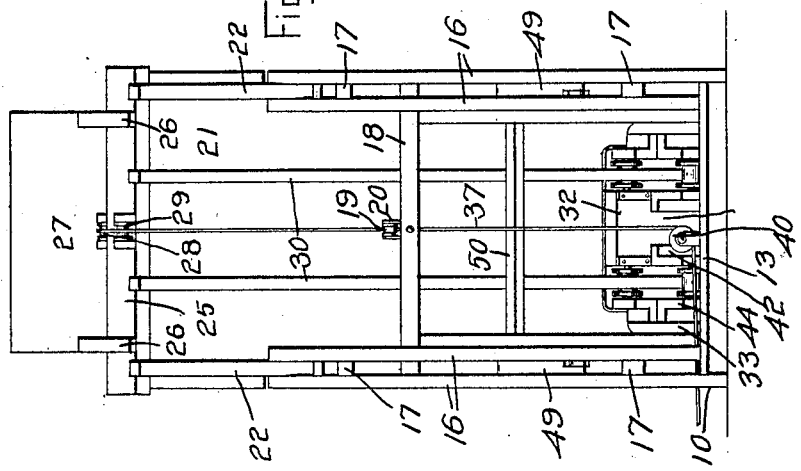
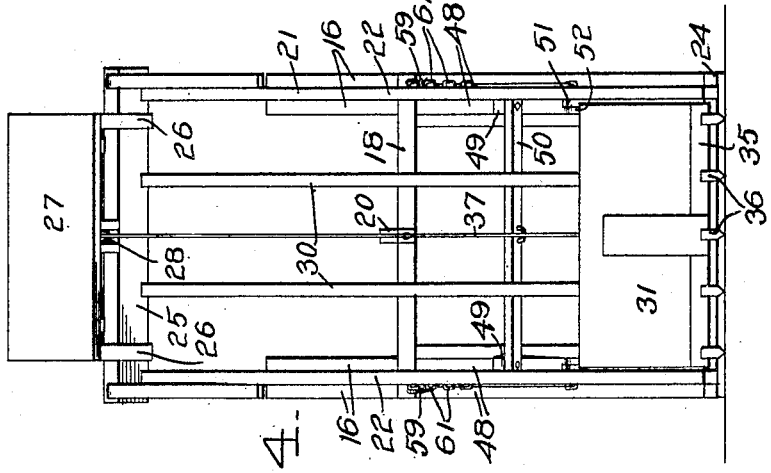

No. 888,219.
PATENTED MAY 19, 1908.
J. F. BRUHN.
HAY STACKER.
APPLICATION FILED SEPT. 23, 1907.
3 SHEETS—SHEET 3.
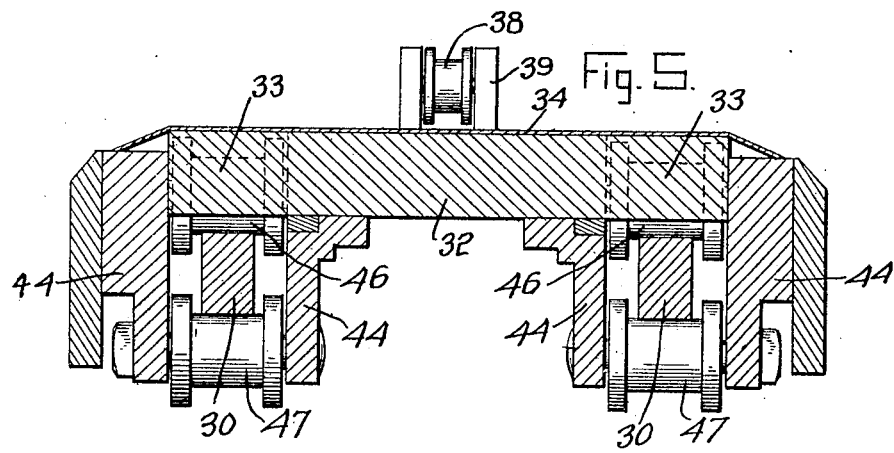
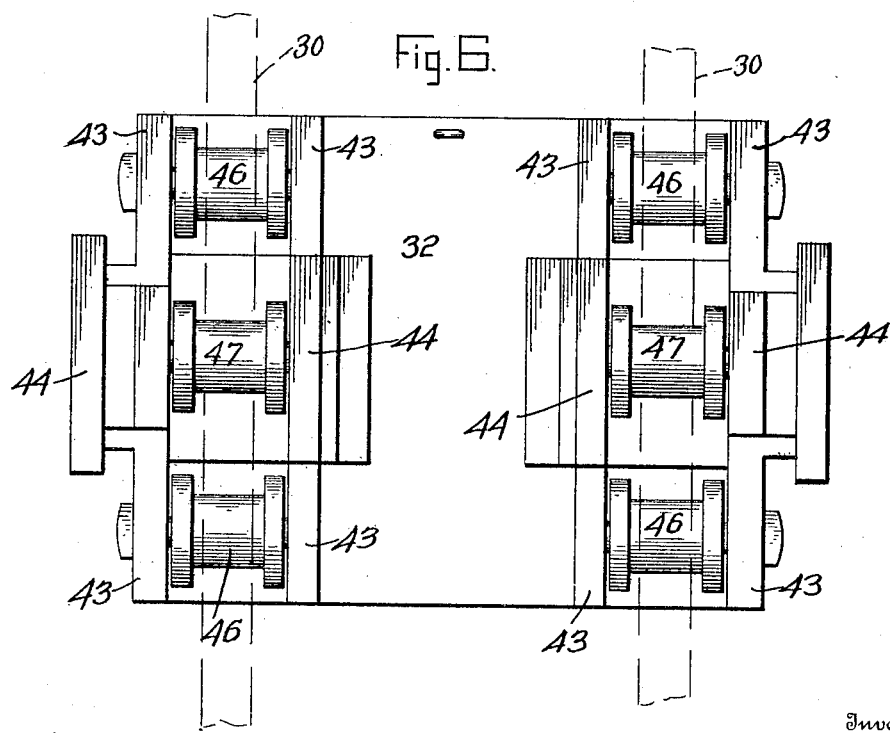

UNITED STATES PATENT OFFICE.

JOHN F. BRUHN, OF LEIGH, NEBRASKA.

HAY-STACKER.

No. 888,219.     Specification of Letters Patent.     Patented May 19, 1908.

Application filed September 23, 1907. Serial No. 394,200.

*To all whom it may concern:*

Be it known that I, JOHN F. BRUHN, a citizen of the United States, residing at Leigh, in the county of Colfax, State of Nebraska, have invented certain new and useful Improvements in Hay-Stackers; and I do hereby declare the following to be a full, clear, and exact description of the invention, such as will enable others skilled in the art to which it appertains to make and use the same.

This invention relates to new and useful improvements in hay stackers, and it has more particular reference to a hay stacker comprising in its broad embodiment an inclined track, a carriage movable thereupon, a sweep mounted upon the carriage, and novel adjunctive features.

In connection with a hay stacker of the above general type, the invention aims as a primary object to provide a hay stacker embodying a novel construction, combination and arrangement of parts.

The details of construction will appear in the course of the following description in which reference is had to the accompanying drawings forming a part of this specification, like characters of reference designating similar parts throughout the several views, wherein:

Figure 1 is a side elevation showing the stacker set up for use. Fig. 2 is a side elevation showing the same in use. Fig. 3 is a rear elevation. Fig. 4 is a front elevation. Fig. 5 is a cross sectional view of the carriage. Fig. 6 is a bottom plan view of the carriage.

In the accompanying drawings, the numeral 10 designates generally a supporting frame, which includes a base portion 11 formed with side bars and with a front cross bar 12. Cross pieces 13 and 14 connect the rear ends of the side bars and the base 11, said side bars being designated by the numeral 15. The cross piece 13 supports at each end thereof vertical posts 16 arranged in pairs and in spaced relation, the posts of each pair being braced by connecting blocks 17 arranged at suitable intervals. Connecting the upper ends of the posts 16 is a cross piece 18 carrying upon its inner face a pulley 19 mounted in a casing 20.

A second frame 21 is mounted upon the frame 10, the frame 21 including side bars 22 which adjacent one end thereof are pivoted as at 23 between the upper ends of the respective pairs of posts 16. The bars 22 are connected at their lower ends by a cross piece 24 and at their upper ends by a cross piece 25 from which is supported by means of brackets 26 a shelf or platform 27 which is raised above the cross piece 25. Upon the upper face of the latter a guide pulley 28 is arranged and a similar guide pulley 29 is secured upon the outer face of the cross piece 25. Secured to the cross pieces 24 and 25 are centrally located spaced tracks 30 which are parallel to the side bars 22, and upon which a carriage designated generally by the numeral 31 is mounted for movement. The carriage 31 includes a base block 32 having side extensions 33. Pivoted at the front end of the base 32 is a plate 35 constituting the sweep above referred and from the lower end of which project spaced parallel angularly disposed tines 36.

Connected to the under face of the plate 35 and at the lower end thereof is a rope or cable 37 which passes under a guide pulley 38 supported in brackets 39 mounted upon the base 32 at the upper end thereof. The rope or cable 37 is trained over the pulleys 28 and 29, and from thence over the pulley 19 and finally under a pulley 40 mounted upon the cross piece 14. The rope or cable 37 is designed for connection at one side of the machine with a single or double tree to which a team may be hitched for operating the movable parts.

Secured to the block 32 in pairs at the front and rear ends thereof are bracket bearings 43 which support the shafts or trunnions of track wheels 46 of which four are employed, the wheels 46 riding upon the upper faces of the tracks 30. Depending from the block 32 centrally thereof, are bracket bearings 44 which support the shafts or trunnions of track wheels 47 arranged at each side of said block and riding upon the lower faces of the tracks 30. The upper face of the block 32 is preferably covered by a wear sheet of tin or other suitable material.

Inclined braces 48 are arranged in pairs between the posts 16 and the side bars 15 and pivoted between the respective pairs of braces 48 are levers 49 connected at their front ends by a cross bar 50 and at their rear ends having pivotal connection with links 51 which work between the respective pairs of braces 48. The links 51 are pivoted at their front ends to vertical levers 52 and the latter are pivoted between their ends as at 53 for movement between the respective pairs of braces 48.

The levers 52 are pivoted at their lower ends to parallel sliding latch members 54, the latter working through supporting guide brackets 55 provided at the ends of the cross piece 12. The cross piece 50 has connection at a central point with a rope or chain 56, the latter being in turn connected to the under face of the block 32. For the purpose of holding the levers 49 and the elements operatively connected therewith against operation, when so desired, a latch hook 57 is pivoted centrally to the bar 12 and is designed for engagement with a staple 58 carried by the cross bar 50. Connected to the ends of the bar 18 are strong retractile coil springs 59 having their ends formed as hooks 60 for engagement in selected ones of a series of staples 61 provided upon the said bars 22. It will be apparent that the tension of the springs 59 may be regulated as desired in accordance with the particular staples 61 with which the hooked ends 60 are engaged.

In operation the parts are normally disposed as shown in Fig. 1, the tines 36 resting upon the ground and the sweep 35 being in a substantially vertical position. Assuming that a load of hay has been placed upon the tines 36 and it is desired to raise and dump the said load the team is driven forwardly, pulling upon the rope or cable 37 and moving the carriage 31 together with the sweep and load upwardly upon the tracks 30. When the carriage 31 reaches the upward limit of its movement the rope or chain 56 will be drawn taut, thereby through the medium of the cross bar 50 and the levers 51, retracting the latch members 54 from engagement with the projecting ends of the bar 24, whereby the frame 21 may swing upon the pivots 23. This action is accomplished by reason of the weight of the carriage and the load at the upper end of the frame 21. When the frame 21 has moved sufficiently to allow the load to slide by gravity from the shelf or platform 27, the springs 59 act to swing the frame 21 in a reverse direction thus restoring the same to the initial position. During the reverse swinging movement of the frame, the carriage 31 moves downwardly upon the tracks 30 by gravity, and as said carriage reaches the limit of its downward movement, the rope or chain 56 will be drawn taut whereby the latch members 54 will, through the connections described, be moved forwardly to engage the ends of the bar 24, so as to hold the frame 21 against premature or accidental swinging movement. At the termination of the downward movement of the carriage 31 the tines 36 and the plate 35 will swing upon their pivot to the normal position above described.

The stacker forming the subject matter of the present invention is more efficient in its operation than the swinging stackers ordinarily employed for the reason that less power is required to raise the carriage, and for the reason that the hay will always be dumped in the center of the stack instead of in front or too far to the sides.

The invention is simple in its structural details, inexpensive to manufacture and practical and efficient in use.

What is claimed is:

1. In a hay loader, the combination with a main frame, of a tiltable frame hinged between its ends to the main frame and provided with spaced longitudinal tracks; a carriage movable upon said tracks; a sweep hinged to said carriage; means normally engaged with the tiltable frame for holding the latter against movement; means operated by the carriage during its upward movement for releasing said holding means from engagement with the tiltable frame, and during its downward movement for causing said holding means to reëngage said tiltable frame; and means for resetting said tiltable frame after each operative movement thereof.

2. In a hay loader, the combination with a main frame, of a tiltable frame hinged between its ends to the main frame and provided with spaced longitudinal tracks; a carriage movable upon said tracks; a sweep hinged to said carriage; sliding latch members normally engaged with the tiltable frame for holding the latter against movement; means operated by the carriage during its upward movement for withdrawing said members from engagement with the tiltable frame, and during its downward movement for causing said members to reëngage said tiltable frame; and means for resetting said tiltable frame after each operative movement thereof.

3. The combination, in a hay loader, of a main frame; a tiltable frame hinged between its ends to the main frame, and including spaced side bars and cross pieces connecting the upper and lower ends of said bars; sliding latch members carried by the main frame and adapted for normal engagement with the lower cross-pieces, to hold the tiltable frame against movement; spaced longitudinal tracks secured at opposite ends to said cross-pieces; a carriage movable upon said tracks; means operated by the carriage during its upward movement for releasing said latch members from engagement with said lower cross-pieces and during its downward movement for causing said latch members to reëngage said lower cross-piece; and means for resetting said tiltable frame after each operative movement thereof.

4. The combination, in a hay loader, of a main frame; a tiltable frame hinged between its ends to the main frame; and including spaced side bars and cross pieces connecting the upper and lower ends of said bars; sliding latch members carried by the main frame and adapted for normal engagement with the lower cross-piece, to hold the tiltable frame against movement; spaced longitudinal tracks secured at opposite ends to said cross-pieces; a carriage movable upon said tracks; a flexible element secured at one end to the carriage; connecting device between the other end of said element and said latch members, for disengaging the latch members from said lower cross-piece during the upward movement of the carriage, and for reëngaging the same with said lower cross-piece during the downward movement of the carriage; and means for resetting said tiltable frame after each operative movement thereof.

5. The combination, in a hay loader, of a main frame; a tiltable frame hinged between its ends to the main frame; and including spaced side bars and cross pieces connecting the upper and lower ends of said bars; sliding latch members carried by the main frame and adapted for normal engagement with the lower cross-piece, to hold the tiltable frame against movement; spaced longitudinal tracks secured at opposite ends to said cross-pieces; a carriage movable upon said tracks; a flexible element secured at one end to the carriage; a pair of levers pivoted to said main frame; a cross-piece connecting the upper ends of said lever and connected to the other end of said flexible element; connecting devices between the lower ends of said levers and said latch members, for disengaging the latter from said lower cross-piece when said levers are swung in one direction by the upward movement of the carriage, and for reëngaging said latch members with said lower cross-piece, when said levers are swung in the opposite direction by the downward movement of the carriage; and means for resetting said tiltable frame after each operative movement thereof.

6. In a hay loader, the combination with a main frame; of a tiltable frame hinged between its ends to the main frame and provided with spaced longitudinal tracks; a raised platform secured to the upper end of the tiltable frame; a carriage movable upon said tracks; a sweep hinged to said carriage and adapted to swing into position to discharge its load upon said platform during the upward movement of the carriage; means for holding the tiltable frame normally against movement; means for releasing said holding means from engagement with said tiltable frame during the upward movement of the carriage and for reëngaging said holding means with said tiltable frame during the downward movement of the carriage; and means for automatically resetting said tiltable frame after each operative movement thereof.

7. In a hay loader, the combination with a main frame; of a tiltable frame hinged between its ends to the main frame and provided with spaced longitudinal tracks; a raised platform secured to the upper end of the tiltable frame; a carriage movable upon said tracks; a sweep hinged to said carriage and adapted to swing into position to discharge its load upon said platform during the upward movement of the carriage; means for holding the tiltable frame normally against movement; means operated by the carriage during its upward movement for releasing said holding means from engagement with said tiltable frame, and during its downward movement for reëngaging said holding means with said tiltable frame; and means for resetting said tiltable frame after each operative movement thereof.

8. In a hay loader, the combination with a main frame, of a tiltable frame hinged between its ends to the main frame and provided with spaced longitudinal tracks; a carriage movable upon said tracks; a sweep hinged to said carriage; wheels supported from said carriage in upper and lower series for engagement with the upper and lower faces of said tracks; means for normally engaging the tiltable frame for holding the latter against movement; means operated by the carriage during its upward movement for releasing said holding means from engagement with the tiltable frame, and during its downward movement for causing said holding means to reëngage said tiltable frame; and means for resetting said tiltable frame after each operative movement thereof.

In testimony whereof, I affix my signature, in presence of two witnesses.

JOHN F. BRUHN.

Witnesses:
X. J. SMITH,
R. J. McNARY.